United States Patent
Ueda et al.

(10) Patent No.: US 11,472,109 B2
(45) Date of Patent: Oct. 18, 2022

(54) THREE-DIMENSIONAL PRINTING APPARATUS

(71) Applicants: Nihon University, Tokyo (JP); Tokyo University of Science Foundation, Tokyo (JP)

(72) Inventors: Masahito Ueda, Tokyo (JP); Ryosuke Matsuzaki, Tokyo (JP); Yoshiyasu Hirano, Tokyo (JP)

(73) Assignees: NIHON UNIVERSITY, Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 454 days.

(21) Appl. No.: 16/485,711

(22) PCT Filed: Feb. 13, 2018

(86) PCT No.: PCT/JP2018/004817
§ 371 (c)(1),
(2) Date: Nov. 25, 2019

(87) PCT Pub. No.: WO2018/151074
PCT Pub. Date: Aug. 23, 2018

(65) Prior Publication Data
US 2020/0130276 A1   Apr. 30, 2020

(30) Foreign Application Priority Data

Feb. 15, 2017   (JP) .............................. JP2017-025745

(51) Int. Cl.
*B29C 64/336*   (2017.01)
*B33Y 30/00*   (2015.01)
(Continued)

(52) U.S. Cl.
CPC .......... *B29C 64/336* (2017.08); *B29C 64/118* (2017.08); *B29C 64/209* (2017.08); *B33Y 30/00* (2014.12)

(58) Field of Classification Search
CPC ... B29C 64/106; B29C 64/241; B29C 64/118; B29C 64/209; B29C 64/336; B33Y 10/00; B33Y 30/00
See application file for complete search history.

(56) References Cited

U.S. PATENT DOCUMENTS 5,134,569 A * 7/1992 Masters .................. B29C 35/08
700/182
8,696,850 B2  4/2014 Beraud et al.
(Continued)

FOREIGN PATENT DOCUMENTS

EP   3124213 A1   2/2017
EP   3 162 539 A1   5/2017
(Continued)

OTHER PUBLICATIONS

International Search Report, PCT Application No. PCT/JP2018/004817, dated Apr. 10, 2018, 4 pages.
(Continued)

*Primary Examiner* — Manley L Cummins, IV
(74) *Attorney, Agent, or Firm* — Dority & Manning, P.A.

(57) ABSTRACT

A three-dimensional printing apparatus (1) allowing a linear filament (F) in which a fiber bundle (C) is impregnated with resin (P) to be continuously ejected includes twisting means (6) for allowing a total amount of twisting of the filament (F) or an amount of twisting of the fiber bundle (C) to be changed.

4 Claims, 5 Drawing Sheets

(51) Int. Cl.
  *B29C 64/118* (2017.01)
  *B29C 64/209* (2017.01)

(56) References Cited

U.S. PATENT DOCUMENTS

| | | | |
|---|---|---|---|
| 9,126,365 B1* | 9/2015 | Mark | B29C 31/042 |
| 2003/0236588 A1* | 12/2003 | Jang | C04B 35/62873 |
| | | | 700/119 |
| 2012/0279441 A1* | 11/2012 | Creehan | B23K 20/128 |
| | | | 228/2.1 |
| 2014/0134334 A1* | 5/2014 | Pridoehl | B29C 64/209 |
| | | | 427/256 |
| 2014/0361460 A1* | 12/2014 | Mark | B29C 70/523 |
| | | | 264/248 |
| 2015/0367576 A1* | 12/2015 | Page | B29C 64/112 |
| | | | 264/257 |
| 2016/0175981 A1* | 6/2016 | Kandasamy | B23K 20/1205 |
| | | | 228/114.5 |
| 2016/0243762 A1 | 8/2016 | Fleming et al. | |
| 2016/0288395 A1* | 10/2016 | Shen | B29C 64/209 |
| 2016/0297104 A1* | 10/2016 | Guillemette | B29C 64/118 |
| 2017/0021573 A1 | 1/2017 | Yerazunis et al. | |
| 2017/0028638 A1* | 2/2017 | Evans | B29C 64/165 |
| 2017/0136690 A1* | 5/2017 | Kanematsu | B33Y 10/00 |
| 2017/0210074 A1* | 7/2017 | Ueda | B33Y 10/00 |
| 2017/0297250 A1* | 10/2017 | Tyler | B29C 48/304 |
| 2017/0361497 A1 | 12/2017 | Crescenti Savall et al. | |
| 2020/0298484 A1* | 9/2020 | Ageishi | B29C 64/241 |
| 2021/0060851 A1* | 3/2021 | Nakai | B29C 70/38 |

FOREIGN PATENT DOCUMENTS

| | | |
|---|---|---|
| JP | WO 2015182675 * | 12/2015 |
| JP | A-2016-501136 | 1/2016 |
| JP | A-2016-531020 | 10/2016 |
| JP | A-2017-128072 | 7/2017 |
| WO | WO 2015/182675 A1 | 12/2015 |
| WO | WO 2015/198706 A1 | 12/2015 |
| WO | WO 2016/092132 A1 | 6/2016 |
| WO | WO 2016/129613 A1 | 8/2016 |

OTHER PUBLICATIONS

Supplementary European Search Report, application EP 18,753,645; dated Oct. 23, 2020 (9 pages).

* cited by examiner

FIG. 5

THREE-DIMENSIONAL PRINTING APPARATUS

TECHNICAL FIELD

The present invention relates to a three-dimensional printing apparatus.

Priority is claimed on Japanese Patent Application No. 2017-025745, filed Feb. 15, 2017, the content of which is incorporated herein by reference.

BACKGROUND ART

For example, PTL 1 discloses a 3D printer (three-dimensional printing apparatus) that molds a three-dimensional structure by melting a resin filament by heat melting and laminating the melt resin filament. In such a 3D printer, it is considered that the strength of a three-dimensional structure to be molded is increased by using a filament in which fiber, such as carbon fiber and glass fiber, is impregnated with resin.

CITATION LIST

Patent Literature

[PTL 1] Published Japanese Translation No. 2016/501136 of the PCT International Publication

DISCLOSURE OF INVENTION

Technical Problem

However, in the three-dimensional printing apparatus using the filament in which the fiber is impregnated with the resin, in order to mold a curved portion or the like, there is a case where a continuous filament is ejected so as to be curved on a platform or the like. If the filament is disposed so as to be curved, twisting gradually occurs in the filament, and the fiber inside the filament is also twisted. If the fiber inside the filament is twisted in this way, there is a possibility that the filament may be unintentionally deformed due to a restoring force of the fiber, and a three-dimensional structure of a shape as designed cannot be created.

The invention has been made in view of the above-described problems, and an object of the invention is to be capable of suppressing deformation of a filament resulting from twisting of fiber and creating a three-dimensional structure as designed, in a three-dimensional printing apparatus using a filament in which the fiber is impregnated with resin.

Solution to Problem

In order to achieve the above object, in the invention, as a first aspect, a three-dimensional printing apparatus allowing a linear filament in which a fiber bundle is impregnated with resin to be continuously ejected includes twisting means for allowing a total amount of twisting of the filament or an amount of twisting of the fiber bundle to be changed.

As a second aspect, the three-dimensional printing apparatus further includes impregnation means for impregnating the fiber bundle with the resin; pull-out means for pulling out the filament from the impregnation means; and pressing means for pressing the filament pulled out by the pull-out means against an ejection target.

As a third aspect, the twisting means is a fiber bundle twisting mechanism that twists the fiber bundle before being supplied to the impregnation means.

As a fourth aspect, the fiber bundle twisting mechanism twists the fiber bundle by turning a fiber bundle bobbin around which the fiber bundle to be supplied to the impregnation means is wound.

As a fifth aspect, the twisting means is a filament twisting mechanism that twists the entire filament ejected from the impregnation means.

As a sixth aspect, the pressing means is a roller in which a heater is built.

As a seventh aspect, the twisting means, on the basis of a design shape of a three-dimensional structure to be created, adjusts the amount of twisting so as to become larger with respect to a portion with a larger curvature in the design shape, and adjusts the amount of twisting so as to become smaller with respect to a portion with a smaller curvature in the design shape.

As an eighth aspect, in a case where a curved portion is formed, the twisting means adjusts the amount of twisting so as to become larger as the number of fibers in the fiber bundle is larger.

Advantageous Effects of Invention

According to the invention, the three-dimensional printing apparatus includes the twisting adjustment unit capable of adjusting the amount of twisting of the fiber bundle. Hence, by twisting the fiber bundle when the curved portion is formed, a difference in required length between fiber disposed inside a curved surface and fiber disposed outside the curved surface can be eliminated, and twisting of fiber caused by bending the filament can be eliminated. Hence, according to the invention, in the three-dimensional printing apparatus using the filament in which fiber is impregnated with the resin, deformation of the filament resulting from the twisting of the fiber can be suppressed, and the three-dimensional structure as designed can be created. Additionally, when the three-dimensional structure is created without driving the twisting adjustment unit using the filament, the twisting gradually accumulated in the filament inside the three-dimensional printing apparatus can be eliminated by twisting the filament by the twisting adjustment unit.

BEST MODE FOR CARRYING OUT THE INVENTION

Hereinafter, embodiments of a three-dimensional printing apparatus related to the invention will be described with reference to the drawings.

Embodiment 1

First Embodiment

A three-dimensional printing apparatus of the present embodiment is an apparatus that forms a structure by continuously disposing a linear (threadlike) filament F including resin (thermoplastic resin P) and a reinforced filament bundle C on a plate-shaped platform. Specifically, the three-dimensional printing apparatus is, for example, an apparatus (three-dimensional printing apparatus) that forms a three-dimensional structure by hardening the filament F after being laminated on the platform in a softened state. As an ejection target, the laminated filament F (structure) is included in addition to the platform.

The filament F used as a raw material of the structure is obtained by impregnating the reinforced filament bundle C, such as carbon fiber and glass fiber, with the thermoplastic resin P, such as polylactic acid (PLA resin), ABS resin, and nylon resin, and linearly forming the reinforced filament bundle C.

Figure 1:
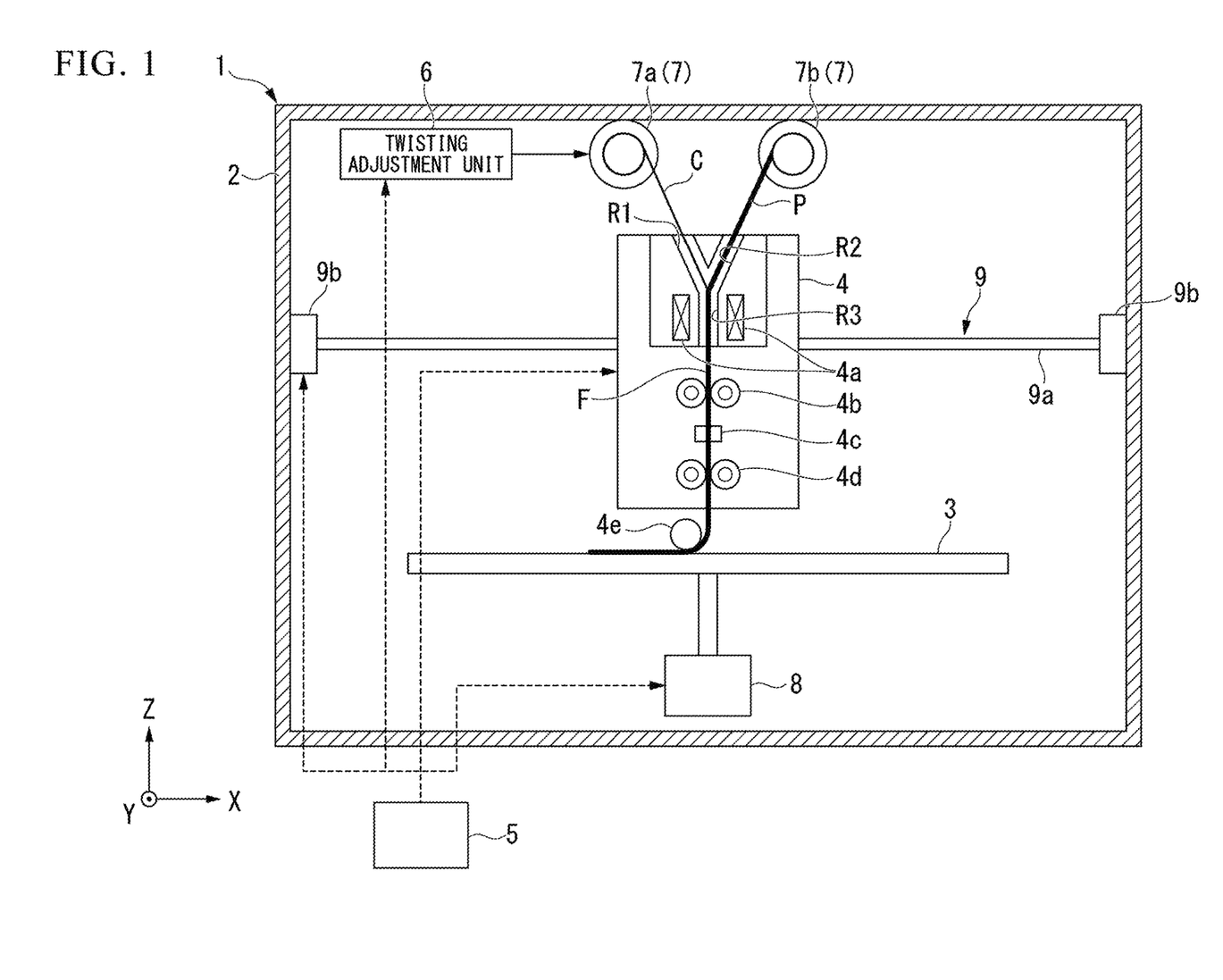
FIG. 1 is an overall configuration view of a three-dimensional printing apparatus related to a first embodiment of the invention.

As illustrated in FIG. 1, the three-dimensional printing apparatus 1 has a casing 2, a platform 3 that is disposed within the casing 2, a printer head 4 that supplies the filament F to the platform 3, a control device 5, a twisting adjustment unit 6 (fiber bundle twisting mechanism), bobbins 7, a platform drive device 8, and a header drive device 9. In FIG. 1, arrow Z indicates a vertical direction (upward-downward direction), arrow X indicates one direction in a horizontal direction, and arrow Y is a direction that is the horizontal direction and is orthogonal to the Z direction and the X direction.

The casing 2 is a box-shaped housing in which at least a front surface is open. The platform 3 is a rectangular plate parallel to a bottom surface 2a of the casing 2. The platform 3 is disposed below the printer head 4 and in the vicinity of a bottom part of the casing 2. The platform 3 is driven by the platform drive device 8 so as to be movable upward and downward in the vertical direction Z. Additionally, the platform 3 is provided with a platform heating device (not illustrated) for heating the disposed filament F. In other words, the platform 3 has a function of heating the filament F disposed on the platform 3.

The printer head 4 has a heater 4a, an upper filament pull-out device 4b (pull-out means), a cutting device 4c, a lower filament pull-out device 4d (pull-out means), and a pressing roller 4e (pressing means). Additionally, a fiber passage R1 through which the reinforced filament bundle C passes, a resin passage R2 through which he thermoplastic resin P passes, and an impregnation passage R3 that is connected to the fiber passage R1 and the resin passage R2 and allows the thermoplastic resin P to be impregnated in the reinforced filament bundle C therethrough by being heated are formed in the printer head 4.

The heater 4a is provided on a lateral side of the impregnation passage R3, and heats the thermoplastic resin P within the impregnation passage R3, thereby melting the thermoplastic resin P. The heater 4a and the impregnation passage R3 constitute impregnation means in the invention. The upper filament pull-out device 4b is constituted of two rollers, sandwiches the filament F impregnated with the thermoplastic resin P, and feeds the filament F downward in the Z direction. The cutting device 4c is a device that is provided below the upper filament pull-out device 4b and cuts a pulled-out filament F at an arbitrary position. The lower filament pull-out device 4d is a device that is provided below the cutting device 4c, is constituted of two rollers, and feeds the filament F toward the platform 3. The pressing roller 4e is a roller that has a heater built therein and presses the ejected filament F toward the platform 3 while heating the ejected filament F.

The control device 5 is a computer that controls the printer head 4 and the platform 3. Specifically, the control device 5 is a device that has a control program that controls the printer head 4 and the like, a storage device that stores 3D data and the like of the structure, and a processor for executing the control program.

The twisting adjustment unit 6 is a device that causes twisting with respect to the reinforced filament bundle C in a fiber bobbin 7a (to be described below) of the bobbins 7. The twisting adjustment unit 6 causes the twisting in the reinforced filament bundle C, for example, by rotating the fiber bobbin 7a around a rotation axis extending in the Z direction. Additionally, the twisting adjustment unit 6 is capable of adjusting the presence/absence of twisting and the amount of twisting on the basis of an instruction from the control device 5. Specifically, as the twisting adjustment unit 6 is controlled by the control device 5, the control device 5 controls rotates the fiber bobbin 7a so as to eliminate the twisting of the fiber caused in a curved portion in the platform 3.

The bobbins 7 are constituted of the fiber bobbin 7a (bobbin for fiber bundles) around which the reinforced filament bundle C is wound, and a resin bobbin 7b around which the thermoplastic resin P is wound. Additionally, the bobbins 7 are rotated around a rotation axis extending in the X direction by a rotating mechanism (not illustrated) and suspend the wound reinforced filament bundle C and the wound thermoplastic resin P downward in the Z direction. The reinforced filament bundle C and the thermoplastic resin P are supplied from the bobbins 7 to the printer head 4. The bobbins 7 are moved together with the printer head 4.

The platform drive device 8 is a device that moves the platform 3 in the Z direction on the basis of an instruction from the control device 5. The header drive device 9 is a device that moves the printer head 4 in the X direction and the Y direction on the basis of an instruction from the control device 5. The header drive device 9 is constituted of an X-axis drive device 9a that moves the printer head 4 in a first direction (X-axis direction) along a surface parallel to the platform 3, and a Y-axis drive device 9b that moves the printer head 4 in a second direction (Y-axis direction) orthogonal to the first direction along the surface parallel to the platform 3. For example, predetermined drive devices in which a ball screw is combined with a linear motion mechanism, such as a stepping motor, can be used for the X-axis drive device 9a and the Y-axis drive device 9b.

If such a three-dimensional printing apparatus 1 in the present embodiment is driven, the fiber bobbin 7a and the resin bobbin 7b is rotated, and the reinforced filament bundle C and the thermoplastic resin P are supplied to the fiber passage R1 and the resin passage R2. The thermoplastic resin P is melted by the heater 4a and is impregnated in the reinforced filament bundle C, thereby becoming the filament F. Moreover, the filament F is conveyed downward in the Z direction by the upper filament pull-out device 4b and the lower filament pull-out device 4d, and reaches the top of the platform 3. Then, the filament F is pressed against the platform 3 or the filament F laminated on the platform 3 by the pressing roller 4e, thereby crushing internal bubbles. Additionally, in a case where the ejected filament F is pressed against the filament F laminated on the platform 3, filament portions F are brought into close contact with each other by being pressed against each other by the pressing roller 4e. In addition, the control device 5 that stores a design shape appropriately moves the platform 3 and the printer head 4 such that the filament F is laminated along the design shape by driving the platform drive device 8 and the header drive device 9.

Figure 2:
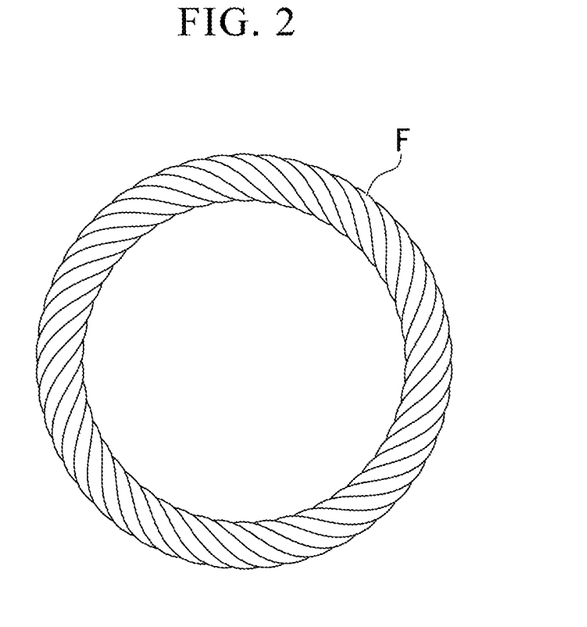
FIG. 2 is a schematic view illustrating the shape of a filament to be formed in the invention.

Additionally, in a case where a curved surface is formed, the control device 5 provides an instruction to the twisting adjustment unit 6, thereby applying twisting to the reinforced filament bundle C supplied from the fiber bobbin 7a. Then, as illustrated in FIG. 2, the filament F in which the reinforced filament bundle C to which the twisting is applied is impregnated with the thermoplastic resin P, is disposed to be curved along the design shape. Accordingly, a difference in required length based a difference in curvature between the inside and outside in a curved portion can be eliminated, and the twisting of the fiber caused by bending the filament F can be eliminated. Hence, in the three-dimensional printing apparatus 1 using the filament F in which the reinforced filament bundle C is impregnated with the thermoplastic resin P, deformation of the filament F by the twisting of the fiber can be suppressed, and a three-dimensional structure as designed can be made. Additionally, when the three-dimensional structure is created without driving the twisting adjustment unit 6, there is a case where the twisting of the filament F may be accumulated gradually inside the three-dimensional printing apparatus 1. In such a case, this accumulation can be eliminated by twisting the filament F by the twisting adjustment unit 6.

In addition, In the case of a design shape in which a curved portion and a planar portionportion are continuous, twisting is applied only to the portion of the reinforced filament bundle C that forms the curved portion, and when the planar portion is formed, the reinforced filament bundle C is brought into a straight state. Accordingly, a molded three-dimensional structure is brought into a state where the twisting is applied to the reinforced filament bundle C only in the curved part, and strength can be maintained by the reinforced filament bundle C being linear in the planar portion. Additionally, on the basis of the design shape, the control device 5 can cause a fiber bundle with a large amount of twisting, that is, a fiber bundle to which much twisting is applied, to be supplied to a portion with a larger curvature, and can cause a fiber bundle with a small amount of twisting to be supplied to a portion with a smaller curvature.

Additionally, according to the present embodiment, the reinforced filament bundle C in a twisted state is impregnated with the thermoplastic resin P. For this reason, the melted thermoplastic resin P is easily entangled in the reinforced filament bundle C, and is easily impregnated in the reinforced filament bundle C.

Moreover, according to the present embodiment, the filament F is pulled out below the impregnation passage R3 by the upper filament pull-out device 4b and the lower filament pull-out device 4d. Accordingly, the three-dimensional printing apparatus 1 of the present embodiment makes an ejection nozzle for ejecting the filament F unnecessary, and the filament F is not blocked in the ejection nozzle. Additionally, the three-dimensional printing apparatus 1 includes the pressing roller 4e, so that bubbles can be prevented from being mixed into the molded three-dimensional structure and filament portions F to be laminated on each other can be brought into close contact with each other.

Additionally, in the present embodiment, the twisting adjustment unit 6 rotates the fiber bobbin 7a around the rotation axis extending the Z direction, thereby applying twisting to the reinforced filament bundle C. Hence, the three-dimensional printing apparatus 1 can adjust the twisting of the reinforced filament bundle C without providing a complicated configuration.

Second Embodiment

Next, a modification example of the above first embodiment will be described as a second embodiment. In addition, components having the same functions as a first embodiment will be designated by the same reference signs.

Figure 3:
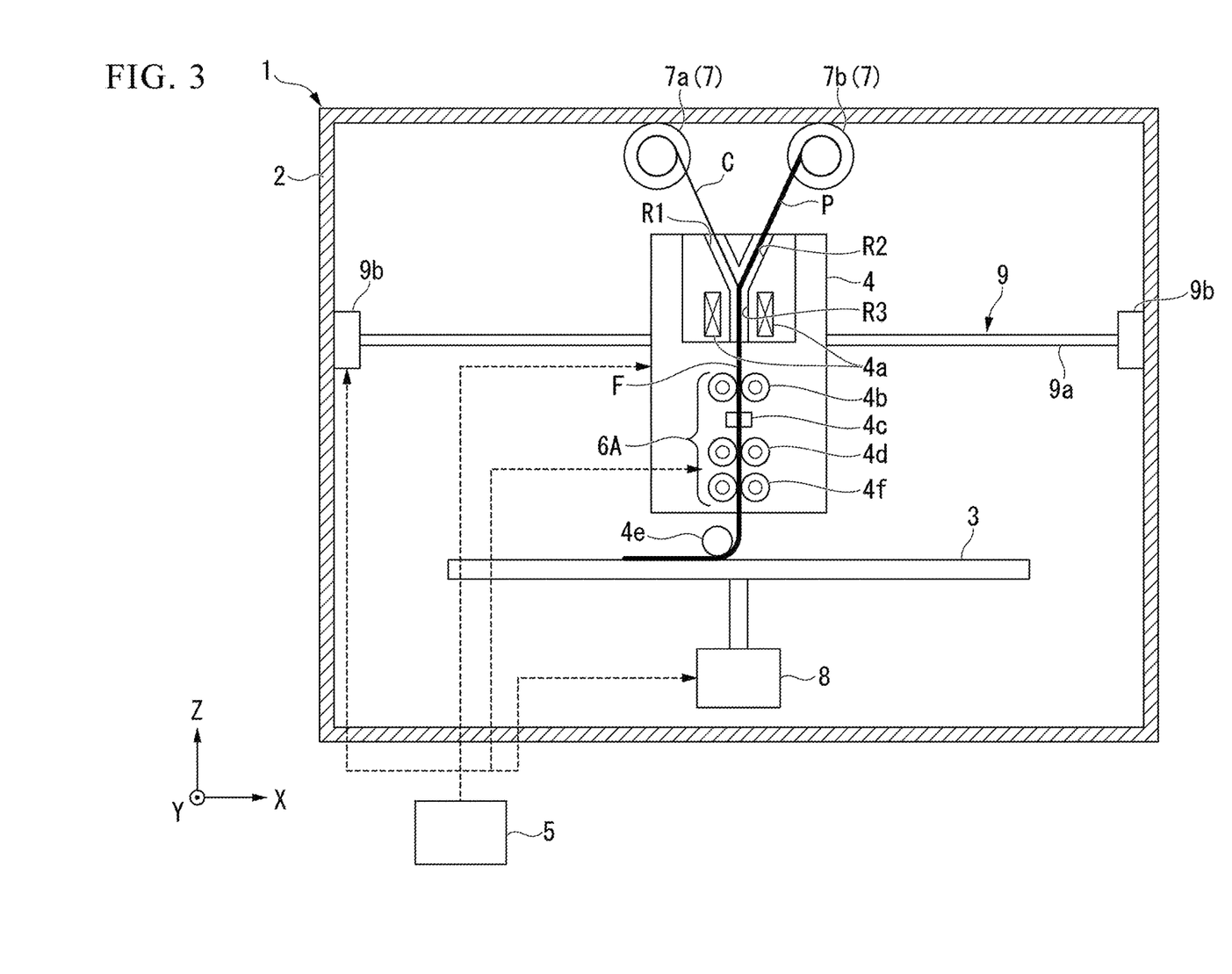
FIG. 3 is an overall configuration view of a three-dimensional printing apparatus related to a second embodiment of the invention.

As illustrated in FIG. 3, the three-dimensional printing apparatus 1 in the present embodiment does not have the twisting adjustment unit 6 that rotates the fiber bobbin 7a, and is configured to apply twisting to the filament F ejected from the impregnation means. Specifically, the printer head 4 further has conveying rollers 4f below the lower filament pull-out device 4d. Additionally, the three-dimensional printing apparatus 1 is provided with a twisting adjustment unit 6A (filament twisting mechanism) that makes the upper filament pull-out device 4b and the conveying rollers 4f rotatable around the rotation axis extending in the Z direction. In addition, the lower filament pull-out device 4d maintains a fixed state when the upper filament pull-out device 4b and the conveying rollers 4f are rotated. Additionally, a heater may be provided around the upper filament pull-out device 4b to heat the filament F.

In such a three-dimensional printing apparatus 1 in the present embodiment, as the upper filament pull-out device 4b and the conveying rollers 4f are rotated in mutually opposite directions around the rotation axis extending in the Z direction in a state where the reinforced filament bundle C is impregnated with the thermoplastic resin P, twisting is caused in the filament F between the upper filament pull-out device 4b and the conveying rollers 4f.

As illustrated in FIG. 2, the filament F to which the twisting is applied is disposed to be curved along the design shape. Accordingly, a difference in required length based a difference in curvature between the inside and outside in a curved portion can be eliminated, and the twisting of the fiber caused by bending the filament F can be eliminated. Hence, in the three-dimensional printing apparatus 1 using the filament F in which the reinforced filament bundle C is impregnated with the thermoplastic resin P, deformation of the filament F by the twisting of the fiber can be suppressed, and a three-dimensional structure as designed can be made.

Additionally, by applying the twisting to the filament F, the thermoplastic resin P moves and becomes uniform. Accordingly, the effect of improving poor impregnation caused when the reinforced filament bundle C is impregnated with the thermoplastic resin P is obtained.

Third Embodiment

Next, another modification example of the above first embodiment will be described as a third embodiment. In addition, components having the same functions as a first embodiment will be designated by the same reference signs.

Figure 4:
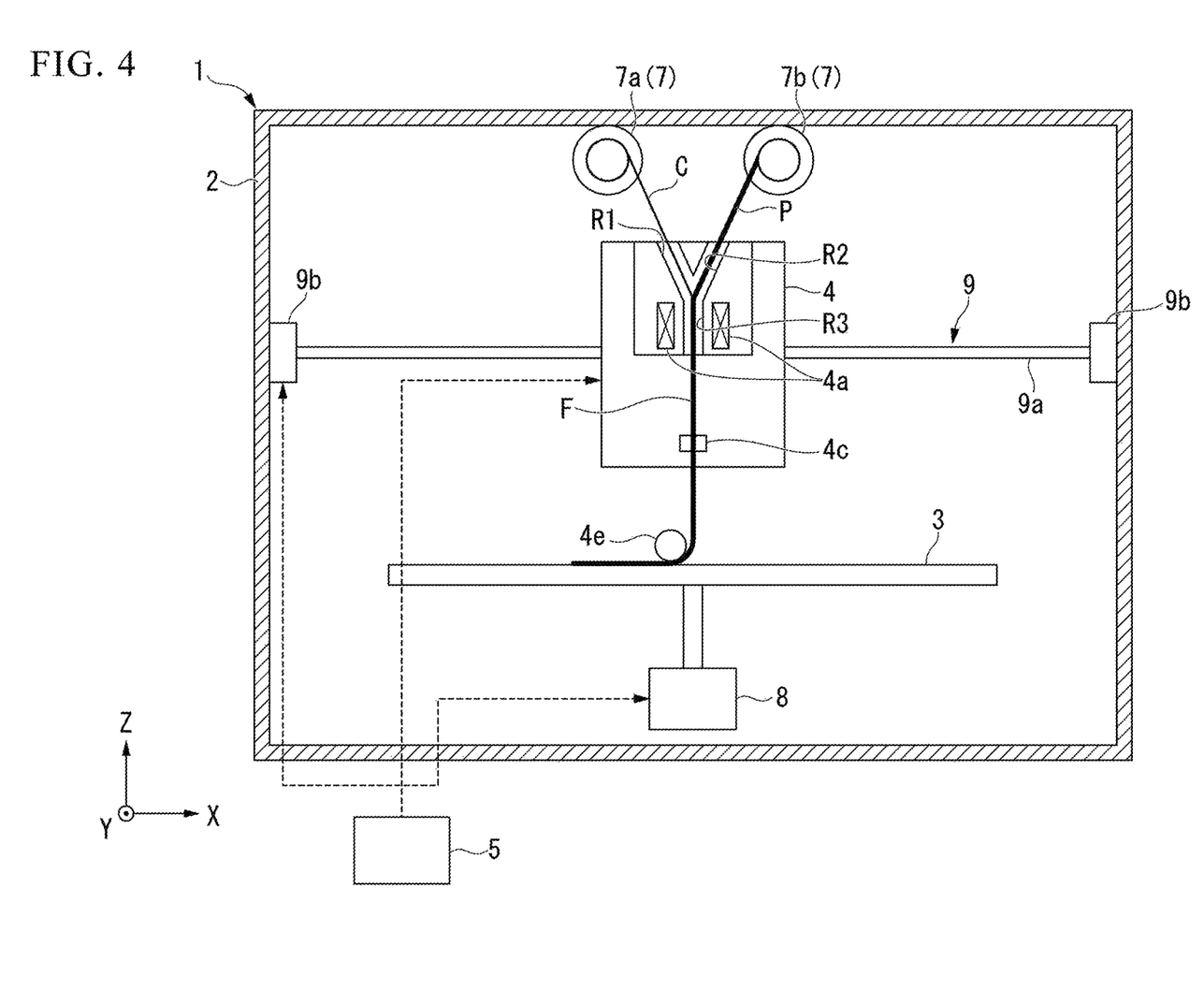
FIG. 4 is an overall configuration view of a three-dimensional printing apparatus related to a third embodiment of the invention.

As illustrated in FIG. 4, the three-dimensional printing apparatus in the present embodiment does not include the upper filament pull-out device 4b, the lower filament pull-out device 4d, and the twisting adjustment unit 6, and is configured such that the printer head 4 is provided with a rotating mechanism (not illustrated). Accordingly, as the printer head 4 rotates, the filament F is ejected from the printer head 4 in a state where the filament F is twisted. Hence, the printer head 4 is equivalent to twisting means in the invention.

By having such a configuration, even in a small-sized three-dimensional printing apparatus in which it is difficult to provide a twisting adjustment device or the like, it is possible to form twisting in the filament F.

Figure 5:
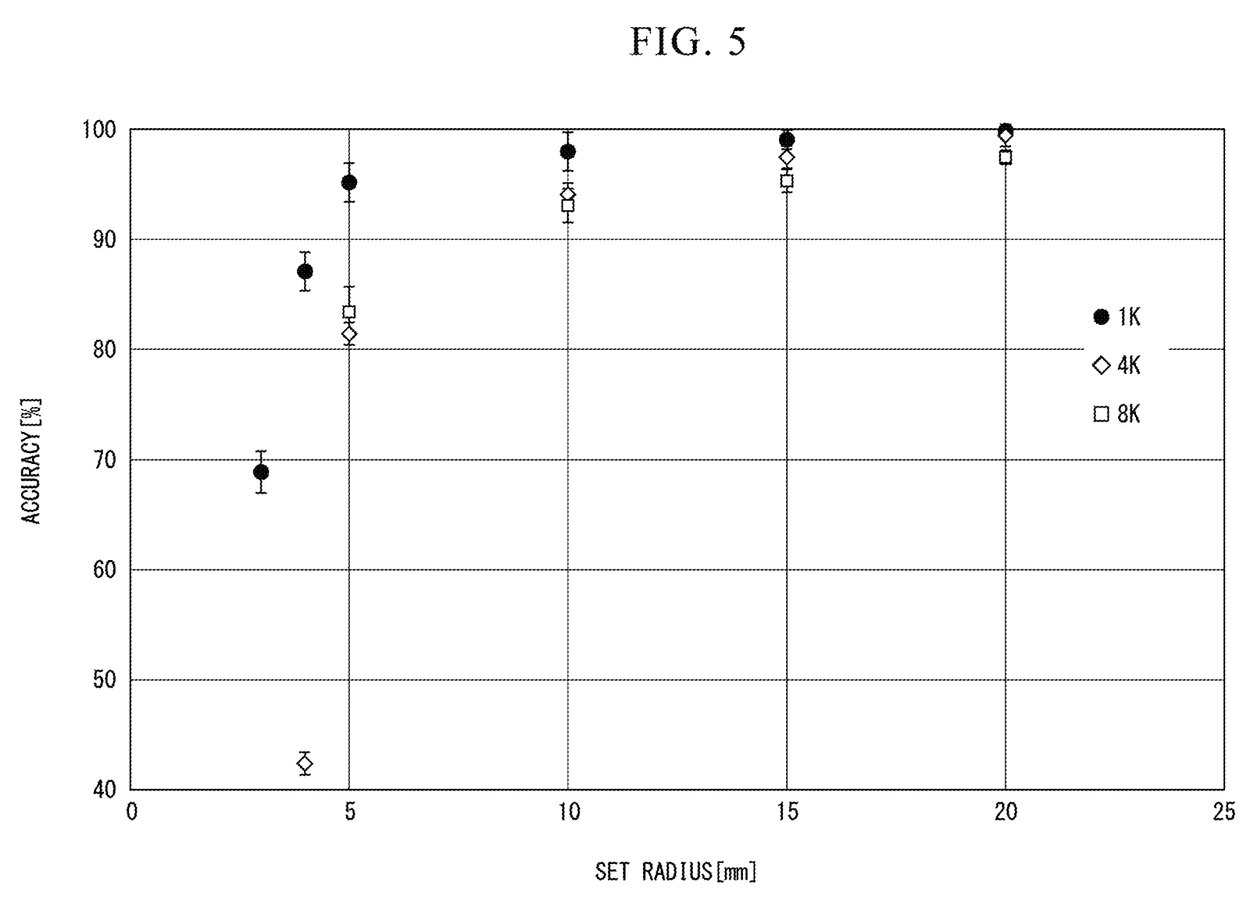
FIG. 5 is a graph illustrating comparison between set dimensions and actual dimensions when twisting has occurred in a filament.

Additionally, FIG. 5 is a graph illustrating a correlation between the accuracy for the radius (set radius) of a set shape in a case where a ring shape is formed using a related-art three-dimensional printing apparatus, and the number of fibers of the reinforced filament bundle C. In addition, the accuracy shows the percentage (%) of the radius (actual radius) of the ring shape that is actually formed with respect to the set radius. Additionally, as for the number of fibers of the reinforced filament bundle C, 1K shows 1000, 4K shows 4000, and 8K shows 8000.

In addition, as illustrated in the graph of FIG. 5, in the related-art three-dimensional printing apparatus, as the set radius is smaller, the accuracy of the actual radius tends to decrease. Additionally, as the number of reinforced filament bundles C is larger, the accuracy of the actual radius tends to decrease. The above tendency shows that, as the set radius becomes smaller, the twisting resulting from the difference between the internal diameter and the external diameter of the filament F becomes larger.

Hence, in the three-dimensional printing apparatus 1 of the invention, by making the amount of twisting larger as the set radius is smaller and making the amount of twisting smaller as the set radius is larger, the twisting of the filament F can be prevented, and more accurate three-dimensional printing is possible. For example, in a case where a curved surface with a curvature radius r [m] is printed, the amount of twisting may be set to 1/r [rad/m].

Moreover, in the three-dimensional printing apparatus 1 of the invention, by making the amount of twisting larger as the number of reinforced filament bundles C is larger, the twisting of the filament F can be prevented, and more accurate three-dimensional printing is possible.

Although the preferred embodiments of the invention have been described referring to the drawings, the invention is not limited to the above embodiments. The shapes, combinations, and the like of the respective constituent members that are shown in the above-described embodiments, are merely examples, and can be variously changed on the basis of design requirements or the like without departing from the spirit of the invention.

In the above embodiments, the twisting adjustment unit 6 is capable of adjusting both the presence/absence of formation of twisting and the amount of twisting. However, the invention is not limited to this. The twisting adjustment unit 6 may adjust only the presence/absence of formation of twisting.

In the above embodiments, the control device 5 adopts a configuration in which twisting is applied to the reinforced filament bundle C or the filament F in the curved portion of the three-dimensional structure on the basis of the design shape. However, the invention is not limited to this. For example, a sensor that detects bending of the filament F may be provided, and the control device 5 may be configured to apply twisting to the filament F when the bending of the filament F is detected at the time of molding the three-dimensional structure.

Additionally, in the above embodiments, the three-dimensional printing apparatus 1 includes a step of impregnating the reinforced filament bundle C with the thermoplastic resin P to generate the filament F. However, the invention is not limited to this. The three-dimensional printing apparatus 1 may supply the filament F that is manufactured by impregnating the reinforced filament bundle C with the thermoplastic resin P in advance. In this case, the three-dimensional printing apparatus 1 can twist the filament F by heating the filament F and applying twisting as shown in the above second embodiment.

Additionally, the reinforced filament bundle C or the filament F in a state where twisting is applied may be supplied to the three-dimensional printing apparatus. The twisting means of the three-dimensional printing apparatus rotates the reinforced filament bundle C or the filament F in a direction in which twisting is eliminated or in a twisting direction, thereby adjusting the amount of twisting. In this case, when a shape with many curved surfaces is formed, a step of adjusting the amount of twisting can be easily and quickly performed.

Additionally, the three-dimensional printing apparatus may not include the platform 3 and may operate in a non-horizontal state with respect to a foundation of a shape to be formed. Moreover, the three-dimensional printing apparatus 1 may include a robot arm for driving the printer head 4, and may move the printer head by the robot arm. In this case, the robot arm can move the printer head in three-dimensional directions.

INDUSTRIAL APPLICABILITY

According to the invention, the twisting gradually accumulated in the filament inside the three-dimensional printing apparatus can be eliminated by twisting the filament by the twisting adjustment unit.

REFERENCE SIGNS LIST

1: three-dimensional printing apparatus
4: printer head
4a: heater
4b: upper filament pull-out device
4c: cutting device
4d: lower filament pull-out device
4e: pressing roller
4f: conveying roller
5: control device
6, 6A: twisting adjustment unit

The invention claimed is:

1. A three-dimensional printing apparatus allowing a linear filament in which a fiber bundle is impregnated with resin to be continuously ejected, the three-dimensional printing apparatus comprising:
   a twister that allows a total amount of twisting of the filament or an amount of twisting of the fiber bundle to be changed based on a design shape of a three-dimensional structure to be created;
   an impregnator that impregnates the fiber bundle with the resin;
   a puller that pulls out the filament from the impregnator, the puller including an upper filament pull-out device and a lower filament pull-out device;
   conveying rollers provided below the lower filament pull-out device; and
   a presser that presses the filament pulled out by the puller against an ejection target,
   wherein the twister is a filament twisting mechanism configured to rotate the upper filament pull-out device and the conveying rollers in mutually opposite directions around a rotation axis extending in a vertical direction with respect to the three-dimensional printing apparatus in a state where the fiber bundle is impregnated with the resin, and twist the entire filament pulled from the impregnator.

2. The three-dimensional printing apparatus according to claim 1,
wherein the presser is a roller in which a heater is built.

3. The three-dimensional printing apparatus according to claim 1,
wherein the twister, on the basis of an instruction from a controller regarding a design shape of a three-dimensional structure to be created, adjusts the total amount of twisting of the filament or the amount of twisting of the fiber bundle so as to become larger with respect to a portion with a larger curvature in the design shape, and adjusts the amount of twisting so as to become smaller with respect to a portion with a smaller curvature in the design shape.

4. The three-dimensional printing apparatus according to claim 1,
wherein in a case where a curved portion is formed, the twister adjusts the total amount of twisting of the filament or the amount of twisting of the fiber bundle on the basis of an instruction from a controller so as to become larger as a number of fibers in the fiber bundle is larger.

* * * * *